United States Patent Office 3,320,286
Patented May 16, 1967

3,320,286
SYNTHESIS OF 2,2-DIMETHYL-7-BENZOFURANOL
Borivoj Richard Franko-Filipasic, Makefield Township, Bucks County, Pa., assignor to FMC Corporation, New York, N.Y., a corporation of Delaware
No Drawing. Filed Mar. 1, 1965, Ser. No. 436,279
4 Claims. (Cl. 260—346.2)

This invention relates to a method of preparing 2,3-dihydro-2,2-dimethyl-7-benzofuranol and more particularly to a method of preparing 2,3-dihydro-2,3-dimethyl-7-benzofuranol from ortho-nitrophenol.

2,3-dihydro-2,2-dimethyl-7-benzofuranol is the precursor for the insecticidal, compound, 2,3-dihydro-2,2-dimethyl-7-benzofuranyl N-methylcarbamate described in U.S. patent application Ser. No. 339,612, filed Jan. 23, 1964. As indicated in that patent application 2,3-dihydro-2,2-dimethyl-7-benzofuranol can be prepared from catechol by reaction with methallyl chloride to form 2-methallyloxyphenol which is then rearranged and cyclized to 2,3-dihydro-2,2-dimethyl-7-benzofuranol. This process results in the formation of the desired compound in good yield but is uneconomical because catechol is an expensive starting material.

It is an object of this invention to provide a method of preparing 2,3-dihydro-2,2-dimethyl-7-benzofuranol in high yield from a relatively inexpensive starting material.

I have now discovered that 2,3-dihydro-2,2-dimethyl-7-benzofuranol can be prepared in high yield from o-nitrophenol by a novel reaction sequence which comprises (a) reacting o-nitrophenol with a methallyl halide to form o-methallyloxy-nitrobenzene, (b) rearranging o-methallyloxynitrobenzene to an isomer selected from the group consisting of 2-nitro-6-methallylphenol and 2-nitro-6-isobutenylphenol, (c) cyclizing said isomer to 2,3-dihydro-2,2-dimethyl-7-nitrobenzofuran, (d) reducing 2,3-dihydro-2,2-dimethyl-7-nitrobenzofuran to 7-amino-2,3-dihydro-2,2-dimethylbenzofuran, (e) diazotizing 7-amino-2,3-dihydro-2,2-dimethylbenzofuran to a salt of 7-diazonium-2,3-dihydro-2,2-dimethylbenzofuran, and (f) hydrolyzing the salt of 7-diazonium-2,3-dihydro-2,2-dimethylbenzofuran to 2,3-dihydro-2,2-dimethyl-7-benzofuranol. In spite of the fact that none of the above reactions are specifically known in the prior art, and it is not obvious that several of these reactions can be carried out, I have found that an overall yield of about 50% of 2,3-dihydro-2,2-dimethyl-7-benzofuranol, based upon the o-nitrophenol starting material, is readily attained by the above reaction sequences.

The o-nitrophenol starting material of this invention is a commercially available compound. Ortho-methallyloxynitrobenzene is prepared by heating o-nitrophenol with a methallyl halide in the presence of an acid acceptor in accordance with the equation:

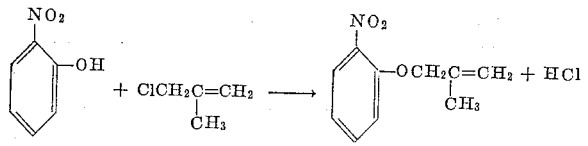

Suitable acid acceptors include alkali metal hydroxides and carbonates. Although methallyl bromide and iodide are more reactive, methallyl chloride is preferred for economic reasons. The reaction mechanism proceeds by way of the phenol salt, and, if desired, the phenol salt may be preformed by reaction of o-nitrophenol with the alkali metal hydroxide or carbonate prior to addition of the methallyl halide.

The etherification reaction may be conducted at the atmospheric boiling point of the mixture, usually 60–125° C. or at superatmospheric pressures, and temperatures up to about 150° C. or higher. Organic solvents such as methanol, dioxane and dimethylformamide may be used in the preparation of o-methallyloxynitrobenzene, as well as low molecular weight ketones such as acetone or methyl ethyl ketone. Unexpectedly I have discovered that considerably shorter reaction times, of the order of one-third the reaction time for organic solvent media, are obtained when the reaction is carried out in aqueous medium. This result is quite surprising in view of the fact that methallyl chloride is essentially insoluble in water thus resulting in a heterogeneous reaction system.

Ortho-methallyloxynitrobenzene can be caused to rearrange to 2-nitro-6-methallylphenol by heating at a temperature of at least about 150° C. in accordance with the following equation:

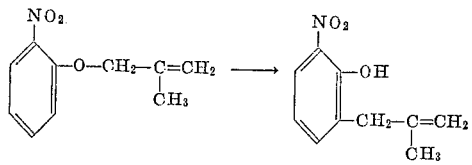

The usual product of this rearrangement is the indicated methallylphenol. However, under certain conditions, particularly alkaline conditions, the isobutenylphenol isomer may predominate. Either or both of these isomers may be cyclized to 2,3-dihydro-2,2-dimethyl-7-nitrobenzofuran in the next step of the process.

Rearrangement of o-methallyloxynitrobenzene is quite surprising in view of the fact that the nitro group is known to be a strong oxidizing agent. It would ordinarily be assumed that under these conditions the nitro group would cause oxidative degradation of the product. However, I have found that essentially no degradation takes place provided the temperature does not exceed about 200° C. A suitable temperature for conducting this reaction is about 150–200° C. and preferably 175–190° C. The reaction is rapid and exothermic, and may be carried out at atmospheric pressure or, alternatively, at partially reduced pressure so that the reactants and reaction products reflux at a somewhat lower reaction temperature. Although high-boiling solvents such as o-dichlorobenzene may be used, it is preferred to operate without a solvent.

Cyclization of 2-nitro-6-methallylphenol or its isobutenyl isomer to 2,3-dihydro-2,2-dimethyl-7-nitrobenzofuran may be carried out under mild temperature conditions in the presence of a suitable catalyst in accordance with the equation:

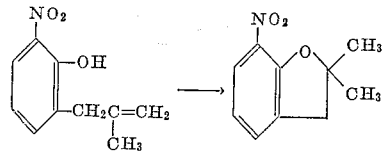

Effective catalysts include acidic materials such as pyridine hydrochloride, phosphoric acid, formic acid, ferric chloride and magnesium chloride. Such catalysts effect cyclization at temperatures of about 100–200° C. and preferably 150–190° C. Preferred catalysts are ferric chloride and magnesium chloride, and excellent results are obtained at levels of 0.1–10 percent and preferably about one percent by weight of the methallylphenol. The cyclization can be carried out simultaneously with the preceeding rearrangement step by adding the cyclization catalyst during the rearrangement reaction. Purification of the crude 2,3-dihydro-2,2-dimethyl-7-nitrobenzofuran may be accomplished, if desired, by fractional distillation after removal of the catalyst by standard procedures. Ordinarily, however, the crude material is sufficiently pure to be used directly in the next step.

In the next step of the process 2,3-dihydro-2,2-dimethyl-7-nitrobenzofuran is reduced to 7-amino-2,3-dihydro-2,2- dimethylbenzofuran. I have found that this reduction is readily accomplished by hydrogenating 2,3-dihydro-2,2-dimethyl-7-nitrobenzofuran in the presence of a hydrogenation catalyst in accordance with the equation:

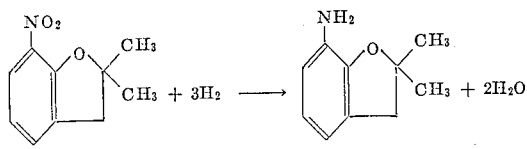

It is quite surprising that this nitro compound can be hydrogenated to convert the nitro group to an amino group in high yield without simultaneously cleaving the furan ring. Any of the conventional hydrogenation catalysts including iron, nickel, cobalt, and noble metals such as ruthenium, rhodium, palladium and platinum may be used for this reaction. A particularly suitable catalyst is palladium-on-carbon. The reaction is exothermic and may be carried out at room temperature or slightly elevated temperatures. Atmospheric or elevated pressure may be used. When using a closed reaction system, superatmospheric pressure is generally employed.

This reduction step can also be accomplished by chemical reduction techniques such as reaction with a dilute acid such as aqueous hydrochloric acid and a metal such as metallic iron or tin. However, such chemical reduction techniques are relatively expensive as compared with reduction by catalytic hydrogenation.

The diazotization step is carried out by reacting 7-amino-2,3-dihydro-2,2-dimethylbenzofuran with sodium nitrite and a mineral acid such as sulfuric acid in accordance with the equation:

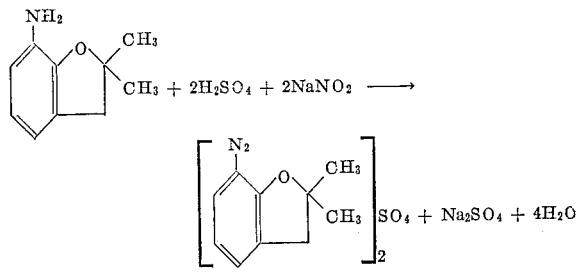

Other mineral acids such as hydrochloric or phosphoric acid could also be used. This reaction readily takes place at room temperature or below. Preferably the reaction medium is cooled below room temperature to minimize side reactions. At temperatures above about 40° C. undesired decomposition of the product takes place.

2,3-dihydro-2,2-dimethyl-7-benzofuranol is formed by contacting the salt of 7-diazonium-2,3-dihydro-2,2-dimethylbenzofuran with water at elevated temperatures in accordance with the equation:

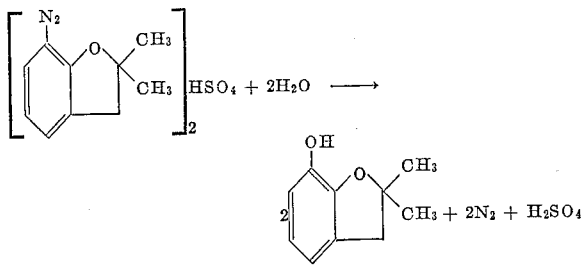

This result is quite surprising in view of the teaching of M. L. Crossley et al. in the Journal of the American Chemical Society, vol. 69, p. 1160 (1947) that ortho-diazonium ethers such as o-methoxybenzenediazonium chloride decompose in the presence of water thereby replacing the methoxy group with a hydroxyl group and subsequent formation of a diazo oxide. However, I have found that in the case of 7-diazonium-2,3-dihydro-2,2-dimethylbenzofuran the desired 7-benzofuranol is formed.

Suitable methods for conducting the hydrolysis include contacting the diazonium salt with superheated steam or with aqueous mineral acid at elevated temperatures. Catalysts may be used to accelerate the reaction and improve the conversion. Useful catalysts include non-volatile mineral acids such as phosphoric and sulfuric acid, and cupric sulfate. Preferably cupric sulfate is used as the catalyst. Rapid removal of the product from the reaction mixture is desirable. This may be accomplished by continuous steam distillation or by continuous solvent extraction of the reaction mixture. If steam distillation is used, recovery of 2,3-dihydro-2,2-dimethyl-7-benzofuranol is accomplished by decantation or by solvent extraction of the distillate obtained from the steam distillation.

The following examples, illustrating the reaction of this invention, are presented without any intention that the invention be limited thereto. All percentages are by weight.

Example 1.—Preparation of o-methallyloxynitrobenzene

To a two-liter reactor equipped with heater, paddle agitator, nitrogen purge line, reflux condenser, thermometer, and an addition funnel, were added 600 ml. of water and 80 g. (2 moles) of sodium hydroxide pellets. To the warm solution was added 278 g. (2 moles) of o-nitrophenol. The mix was warmed until solution occurred at a temperature below 70° C. To the solution were added 236 g. (2 moles) of methallyl chloride over a period of 20 min. with moderate agitation and controlled refluxing. The heat input was regulated so that the reaction temperature rose slowly as the etherification proceeded. After a period of 5 hrs. at a temperature of 88–90° C., the mixture was cooled to 30° C., sequentially extracted with pentane, 25% benzene in pentane, and finally with 50% benzene in pentane. The organic layers were combined and concentrated to give 356 g. of crude product. Distillation of this material gave 320 g. of o-methallyloxynitrobenzene, B.P. 86–107° C. at 0.1 mm. Hg.

Example 2.—Rearrangement and cyclization of o-methallyloxynitrobenzene

Rearrangement of the o-methylallyloxynitrobenzene was carried out in a reactor equipped for slow stirring and for maintaining an inert atmosphere. To the reactor was charged 193 g. (1 mole) of o-methallyloxynitrobenzene prepared in Example 1 and 2 g. of anhydrous magnesium chloride. An atmosphere of nitrogen was maintained in the reactor as heating and stirring were begun. A temperature of 180° C. was attained after 30 min. which was considered the starting point of determination of the rate of rearrangement and cyclization. Samples of the reaction mass were withdrawn at intervals and subjected to gas chromatographic analysis to determine the presence of unreacted ether, the rearranged 2-nitro-6-methallylphenol, and the cyclized 2,3-dihydro-2,2-dimethyl-7-nitrobenzofuran. The following table indicates the progress of the reaction:

| Time, hrs. | Temp., ° C. | Ether, mole percent | Phenol, mole percent | Benzofuran, percent |
|---|---|---|---|---|
| 0 | 181 | 100 | | |
| 1 | 183–187 | 60 | 24 | 16 |
| 2 | 178–184 | 44 | 16 | 40 |
| 3 | 185 | 33 | 7.5 | 59.5 |
| 6 | 180–185 | >5 | <1 | 94 |
| 7 | 185 | >5 | <1 | 94 |

After 7 hours the reaction was cooled whereupon the medium solidified. Vacuum distillation of the reaction mass yielded 135 g. (0.695 mole) of 2,3-dihydro-2,2-dimethyl-7-nitrobenzofuran (B.P. 109–120° C. at 0.15 mm. Hg) per mole of crude starting material. A portion of this product was recrystallized once from methanol, and found to have a melting point of 65–67° C.

*Example 3.—Reduction of 2,3-dihydro-2,2-dimethyl-7-nitrobenzofuran*

To a 500 ml. flask were charged 25 g. (0.13 mole) of recrystallized 2,3 - dihydro - 2,2-dimethyl-7-nitrobenzofuran from Example 2, 230 ml. absolute ethanol, and 250 mg. of 5% palladium-on-carbon catalyst. The flask was purged of atmospheric gases and pressured to 50 p.s.i.g. with hydrogen. Agitation was effected and pressure maintained over a period of one hour during which the temperature range was 25–45° C. The pressure reduction due to hydrogen take-up was 35 p.s.i. Distillation of the reaction mass yielded 20.1 g. (0.123 mole, 95% yield) of 7 - amino-2,3-dihydro-2,2-dimethylbenzofuran, B.P. 60° C. at 0.1 mm. Hg, $n_D^{23}$=1.5590.

Analysis.—Calcd.: C, 73.7; H, 8.0; N, 8.58. Found: C, 73.71; H, 8.09; N, 8.85.

NMR analysis verified the structure of this product.

*Example 4.—Preparation and hydrolysis of 7-diazonium-2,3-dihydro-2,2-dimethylbenzofuran sulfate*

To a 100 ml. beaker containing 25 ml. of water and 3 g. of conc. $H_2SO_4$ at room temperature was charged 5 g. (0.030 mole) of 7-amino-2,3-dihydro-2,2-dimethylbenzofuran. The solution was cooled to 10° C. and 1.5 g. of conc. $H_2SO_4$ added with stirring. A cool solution of 2.2 g. (0.032 mole) of $NaNO_2$ in 10 ml. of water was added over a period of several minutes to the agitated amine sulfate solution which had been cooled to 2° C. The peak exotherm reached during the reaction was 12° C. After all of the $NaNO_2$ solution had been added, testing with KI-starch paper indicated the presence of $HNO_2$. The solution was allowed to come to 20° C. after which the test for $HNO_2$ was still positive. The addition of 0.1 g. of urea to the solution resulted in a negative $HNO_2$ test.

The 50 ml. of yellow-brown solution of the diazonium sulfate prepared above was added drop by drop to a 250 ml. reactor containing 125 ml. of boiling, agitated, saturated $CuSO_4$ solution through which superheated steam was passed at the rate of about 600 g. per hr. Addition of all of the diazonium sulfate required 35 min. The product was separated from the steam distilled material by extraction with benzene. Concentration of the organic phase in vacuo yielded 3.5 g. (70% of the amine charged) of a thin, brown fluid, $n_D^{22.5}$=1.5385. NMR analysis indicated that the material was predominantly (95%) 2,3-dihydro-2,2-dimethylbenzofuranol.

To further prove the structure of the above product, 2.3 g. of this product was added to a flask along with 3.5 ml. of diethyl ether, 6 microliters of triethylamine, and 0.64 g. of methyl isocyanate. After standing overnight the slurry was filtered, washed with diethyl ether and dried to produce white crystalline 2,3-dihydro-2,2-dimethylbenzofuranyl N-methyl-carbamate having a melting point of 150–151° C.

As will be apparent to those skilled in the art, numerous modifications and variations of the embodiments illustrated above may be made without departing from the spirit of the invention or the scope of the following claims.

What is claimed is:
1. A process of preparing 2,3-dihydro-2,2-dimethyl-7-benzofuranol which comprises
   (a) reacting o-nitrophenol with a methallyl halide to form o-methallyloxynitrobenzene,
   (b) rearranging o-methallyloxynitrobenzene to an isomer selected from the group consisting of 2-nitro-6-methallylphenol and 2-nitro-6-isobutenylphenol,
   (c) cyclizing said isomer to 2,3-dihydro-2,2-dimethyl-7-nitrobenzofuran,
   (d) reducing 2,3 - dihydro-2,2-dimethyl-7-nitrobenzofuran to 7 - amino-2,3-dihydro-2,2-dimethylbenzofuran,
   (e) diazotizing 7 - amino-2,3-dihydro-2,2-dimethylbenzofuran to a salt of 7-diazonium-2,3-dihydro-2,2-dimethylbenzofuran,
   (f) hydrolyzing the salt of 7-diazonium-2,3-dihydro-2,2-dimethylbenzofuran to 2,3-dihydro-2,2-dimethyl-7-benzofuranol.

2. A process of preparing 2,3-dihydro-2,2-dimethyl-7-benzofuranol which comprises
   (a) reacting o-nitrophenol with a methallyl halide to form o-methallyloxynitrobenzene,
   (b) rearranging and cyclizing o-methallyloxynitrobenzene to 2,3 - dihydro-2,2-dimethyl-7-nitrobenzofuran,
   (c) hydrogenating 2,3 - dihydro-2,2-dimethyl-7-nitrobenzofuran to 7 - amino-2,3-dihydro-2,2-dimethylbenzofuran,
   (d) diazotizing 7 - amino - 2,3-dihydro-2,2-dimethylbenzofuran to a salt of 7-diazonium-2,3-dihydro-2,2-dimethylbenzofuran,
   (e) hydrolyzing the salt of 7-diazonium-2,3-dihydro-2,2 - dimethylbenzofuran to 2,3-dihydro-2,2-dimethyl-7-benzofuranol.

3. A method of preparing 7-amino-2,3-dihydro-2,2-dimethylbenzofuran which comprises hydrogenating 2,3-dihydro-2,2-dimethyl-7-nitrobenzofuran in the presence of a hydrogenation catalyst thereby obtaining 7-amino-2,3-dihydro-2,2-dimethylbenzofuran in high yield.

4. A method of preparing 2,3-dihydro-2,2-dimethyl-7-benzofuranol which comprises reacting a salt of 7-diazonium-2,3-dihydro-2,2-dimethylbenzofuran with water thereby obtaining 2,3-dihydro-2,2-dimethyl-7-benzofuranol in high yield.

References Cited by the Examiner

UNITED STATES PATENTS 2,312,801  3/1943  Craig et al. _____ 260—612 X
3,213,112  10/1965  Neely et al. _____ 260—347.7 X

OTHER REFERENCES

Tarbell: Organic Reactions (Rodgers et al., editors, 1944), vol. II, pages 1, 2 and 11.

Brewer: Organic Chemistry (1948), page 577.

ALEX MAZEL, *Primary Examiner.*

H. R. JILES, *Assistant Examiner.*